United States Patent
Weiler

(10) Patent No.: US 9,938,471 B2
(45) Date of Patent: Apr. 10, 2018

(54) PROCESS FOR REFINING USED LUBRICATING OIL

(71) Applicant: Martin Weiler, Burns Harbor, IN (US)

(72) Inventor: Martin Weiler, Burns Harbor, IN (US)

( * ) Notice: Subject to any disclaimer, the term of this patent is extended or adjusted under 35 U.S.C. 154(b) by 138 days.

(21) Appl. No.: 14/827,383

(22) Filed: Aug. 17, 2015

(65) Prior Publication Data

US 2016/0053188 A1 Feb. 25, 2016

Related U.S. Application Data

(60) Provisional application No. 62/038,931, filed on Aug. 19, 2014.

(51) Int. Cl.

| | |
|---|---|
| B01D 17/02 | (2006.01) |
| B01D 17/04 | (2006.01) |
| C10G 19/00 | (2006.01) |
| C10G 31/10 | (2006.01) |
| C10G 33/06 | (2006.01) |
| C10G 53/12 | (2006.01) |

(52) U.S. Cl.
CPC ......... *C10G 31/10* (2013.01); *B01D 17/0217* (2013.01); *B01D 17/042* (2013.01); *B01D 17/047* (2013.01); *C10G 19/00* (2013.01); *C10G 33/06* (2013.01); *C10G 53/12* (2013.01); *C10G 2300/1074* (2013.01)

(58) Field of Classification Search
CPC ........ C10G 19/00; C10G 31/10; C10G 33/06; C10G 53/12; C10G 2300/1074; B01D 17/02; B01D 17/0217; B01D 17/042; B01D 17/12; B01D 17/04712

See application file for complete search history.

(56) References Cited

U.S. PATENT DOCUMENTS

| | | | |
|---|---|---|---|
| 2,446,489 A | 8/1948 | Schaafsma | |
| 3,265,212 A * | 8/1966 | Bonsall, Jr. ............ | C10G 31/10 210/167.31 |
| 2006/0272983 A1* | 12/2006 | Droughton ........... | C10G 25/003 208/177 |

* cited by examiner

Primary Examiner — Lucas Stelling
(74) Attorney, Agent, or Firm — Daniel Zamudio

(57) ABSTRACT

A process for taking non-treated re-refined vacuum gas oil and pretreating the product before the product is hydrotreated and used for fuel oil blends.

18 Claims, 2 Drawing Sheets

PROCESS FOR REFINING USED LUBRICATING OIL

CROSS-REFERENCE TO RELATED APPLICATIONS

The present application claims the benefit of U.S. Provisional Patent Application No. 62/038,931, filed Aug. 19, 2014, the entirety of which is hereby incorporated by reference.

BACKGROUND

Recycling used oil, often referred to as re-refining used lubricating oil is a little known process to the general public, re-refining is a proven industrial process for producing high quality lubricants and has been around for some time. Processing used oil, motor oil for example, into re-refined oil lubricants such as Group I, II, III base oil or vacuum gas oil (non-hydrotreated) generally involves collection, filtration, dehydration, distillation, hydrotreatment and fractionation (if necessary). Prior to used motor oil being re-refined into base oil and vacuum gas oil (VGO) a variety of processes are used to reduce the contaminant particles, organic metals, and chemical additives which include polymers that are present in the used motor oil.

A problem for re-refiners is the presence of chemical additive polymers in synthetic oil (Polyalpha-olefin), semi-synthetic oil, and blended base oil. For example, additives are introduced to base oils. These can include rust and corrosion inhibitors, detergents, dispersants, antifoaming agents, oxidation inhibitors, extreme pressure additives, and viscosity index improvers such as Olefin co-polymers (OCP) and Styrene/diene co-polymers. Expensive equipment that is used in the process of recycling used motor oil into base oil or vacuum gas oil become fouled by these additives. This causes failure of vacuum distillation and hydrotreating equipment. Because these polymers are not removed from the vacuum gas oil they adversely affect hydrotreating processes and oil blend performance, such as that of marine fuel.

One method of removing unwanted particles from used oils is with chemicals. Processors, particularly re-refiners, add chemicals during a pretreatment and post dehydration phase of oil processing to remove impurities from oil, such as vacuum gas oil. Chemical treating at this early stage of such processes removes metals but does not remove polymers (i.e. de-polymerize) from vacuum gas oil. Another method for removing impurities is by the use of clay and bauxite to filter the vacuum gas oil prior to hydrotreating. This process does not remove the polymers and generates waste solids causing a difficult and expensive disposal and environmental hazards. Another spent polymer removal method is by storing vacuum gas oil under a nitrogen blanket in an attempt to de-polymerize the vacuum gas oil. This only removes oxygen from the vacuum gas oil and does not remove polymers. Either of these processes would result in a product that remains polymer saturated and fouls up a hydrotreating process. This complex problem warrants further explanation.

Through a hydrotreating process, vacuum gas oil ("VGO") is introduced to at least one catalyst reactor bed and subjected to hydrogen under high temperature and pressure to produce base oils. The base oils can then be hydrotreated, fractionated and blended with appropriate chemical additives specific to an end use, hydraulic or motor oil for instance, and then sold. The problem is that particles, polymers for example, found in the VGO prior to the hydrotreating process cause the catalyst reactor bed to foul prematurely.

Explaining an example of this problem further, in a typical hydrotreating process, ceramic support balls are loaded into the bottom of a vessel, referred to as a reactor, to provide support for a catalyst and to filter oil to be treated, VGO for instance. The vessel is then filled with a catalyst and then more support balls for filtering and distribution of an influent oil/hydrogen mix. This forms catalyst reactor beds designed to remove metals by bonding those metals to the catalysts. However, the catalyst is not used for removing polymers. The typical hydrotreating process will involve first reactors, or guard beds, with a less expensive catalyst used for reducing the metals and attempting to remove some polymers present in the vacuum gas oil, resulting in a partially treated VGO. Importantly, the partially treated VGO still contains polymers. The partially treated VGO carries these remaining polymers to expensive final stage reactors. Catalyst reactor beds in those final stage vessels clog with these remaining polymers and a pressure drop occurs. When these reactor beds experience this pressure drop, support balls and catalysts must be changed out resulting in product loss and high maintenance costs. In a typical used motor oil re-refining process, for instance, the hydrotreating reactor beds need to be changed out every one to six months. Notably, in a crude oil hydrotreating process, catalyst reactors operate for a few years without change because crude oil does not have fouling particles, such as manmade chemical additive polymers that are present in used motor oil.

Clearly, re-refiners using a hydrotreating process for VGO must regularly maintain the hydrotreating vessels, such as by changing out the catalyst reactor beds, because of polymer clogging, fouling. Changing out these catalyst beds is expensive and decreases revenue because the process must be halted.

Another problem in the oil re-refining and crude oil refining industry is the introduction of impurities into mixed oil end use products. For example, vacuum gas oil and crude vacuum gas oil is blended with fuels to make a marine oil, which is an oil blend. Marine oil is distributed for use in diesel marine combustion engines Crude vacuum gas oil and non-treated re-refined vacuum gas have some of the same characteristics except that no chemical additives are present in crude oil. However, troublesome impurities such as sludge and asphaltene-like compounds are found in both streams which may settle in ship bunkers and eventually clog filters and deposit on engine parts. In order to remove these impurities, centrifuges and clarifiers may have to be incorporated in the ship's hull prior to engine combustion. Another problem is the introduction of sulphur into the atmosphere from the use of fuel oils.

For the foregoing reasons, there is a need in the used oil re-refining industry for a process which will completely, efficiently, and cost effectively eliminate spent lubricant additives as part of the re-refining process. A process whereby saturated polymers in post-distillation vacuum gas oil are substantially removed. Additionally, the needed process should be such that organic impurities (e.g. asphaltenes, zinc, magnesium, phosphor and sulphur) are considerably reduced in the vacuum gas oil prior to distribution for marine fuel operations or hydrotreating. By such a needed process, hydrotreating and marine fuel operations should be greatly optimized by the use of the process' treated vacuum gas oil through lower operational costs, improved product quality and sales while at the same time emitting less sulfur to the atmosphere. Current re-refining operations should be retrofittable with the needed process incurring minimal equipment costs resulting in substantial operational cost savings rapidly off-setting the retrofit costs. There is also a need in the industry for a VGO with superior non-obstructing qualities useful in fuel oil blends and for reducing pollution.

SUMMARY

The present invention is directed to a process, the utility of which is to meet these needs of the re-refining industry by eliminating an undesirable waste product prior to hydrotreating and marine fuel distribution. This utility provides a treated product that makes hydrotreating and marine fuel operations more efficient and less costly while emitting less sulphur (SO2) to the atmosphere.

The present invention's utility can also be seen in the way it greatly optimizes hydrotreater operations because the majority of impurities are removed from the used lubricating oil. Changing hydtrotreater feedstock to oil treated by an embodiment of the present invention has the advantages of more uptime, fewer reactor catalyst change outs, reduced labor costs associated with reactor catalyst change out, increased safety due to fewer confined space entries inside reactors, less spent catalyst disposal cost which means less going into landfills, simplified planning of turnarounds instead of the uncertainty with polymer saturated VGO. In addition, embodiments of the invention will result in less hydrotreater process chemical addition and lower cost necessary to control H2S and SO2 emissions, because sulphur content of treated VGO is 0.05% m/m-0.07% m/m compared to non-treated VGO having approximately 0.08% m/m-0.20% m/m. The invention may initiate a potential change in how hydrotreaters are engineered and designed, i.e. less reactors needed while producing and making a purer Group II base oil, which may increase sales.

With regard to vacuum gas oil purification, an embodiment of the present invention involves a complex chemical and physical reaction between a controlled concentration of sodium hydroxide or another alkali, under specific operating conditions, and the undesirable components contained in a select VGO, allowing them to be removed through centrifugal force. Vacuum gas oil is mixed with a designated sodium hydroxide solution at a controlled temperature and time. The mixture reacts, facilitating the bonding and coalescence of contaminants. The remaining colloidal mixture is separated with centrifugal force leaving a two-phase mixture of impurities and polished VGO. Centrifugal separation is achieved by feeding the reacted mixture of VGO, contaminants and sodium hydroxide into a primary centrifuge where sufficient centrifugal force expeditiously separates the spent polymer, suspended impurities, asphaltene, metals and sodium hydroxide from the VGO. The VGO effluent from the primary centrifuge is directed to a secondary centrifuge to remove any remaining residual contaminants yielding the purified finished product.

Another embodiment of the present invention is a process for re-refining VGO with caustic substance. The caustic substance is one that chemically reacts with carbonaceous and other compounds in the VGO. Then mixing the VGO and caustic substance, caustic strength cannot be too low or too high to achieve the desired result, to form a mixture which is then settled and heated. A preferred embodiment has a mix with a caustic that is diluted, with water for instance, to a 25% strength and mixed in a ratio of 0.014 caustic to oil, for example 280 gallons of a sodium hydroxide caustic diluted to a strength of 25% is mixed with 20,000 gallons of oil, though other mix ratios may prove effective.

The next step is applying a separating force to the mixture. This is done by the use of centrifugal force that is sufficient to separate unwanted particles from the desired VGO. Next is placing materials that have been separated by the force applied to the mixture into separate groups that contain useful VGO or those that contain primarily undesired particles, such as polymers. Then a further separating force is applied to oil-containing, e.g. VGO containing, groups and the materials that have been separated by the force applied to the oil-containing groups are placed into subgroups. These subgroups yield groups of purer VGO, that is, oil-containing subgroups, with less water and salts. The next step in the process is the step of testing the oil-containing subgroups for sufficient separation of unwanted materials and, if sufficiently separated as determined by prior testing, making the oil-containing subgroup available for end use. The waste liquids, such as polymers, may be sold for use in other applications, such as asphalt viscosity modifiers.

Notably, an embodiment of this invention acknowledges the negative impact of spent lubricant chemical additives, one example of unwanted material, in the used oil re-refining industry. It could change used oil pre-qualification for re-refiners by lessening the re-refiner's inbound used oil limit specifications thereby allowing for purchase of less expensive and lesser quality used oil because the embodiment reduces organic metals such as phosphorus and sulphur.

BRIEF DESCRIPTION OF THE SEVERAL VIEWS OF THE DRAWINGS

These and other features, aspects and advantages of the present invention will become better understood with regard to the following description, appended claims, and accompanying drawings where:

DESCRIPTION

Overview

Figure 1:
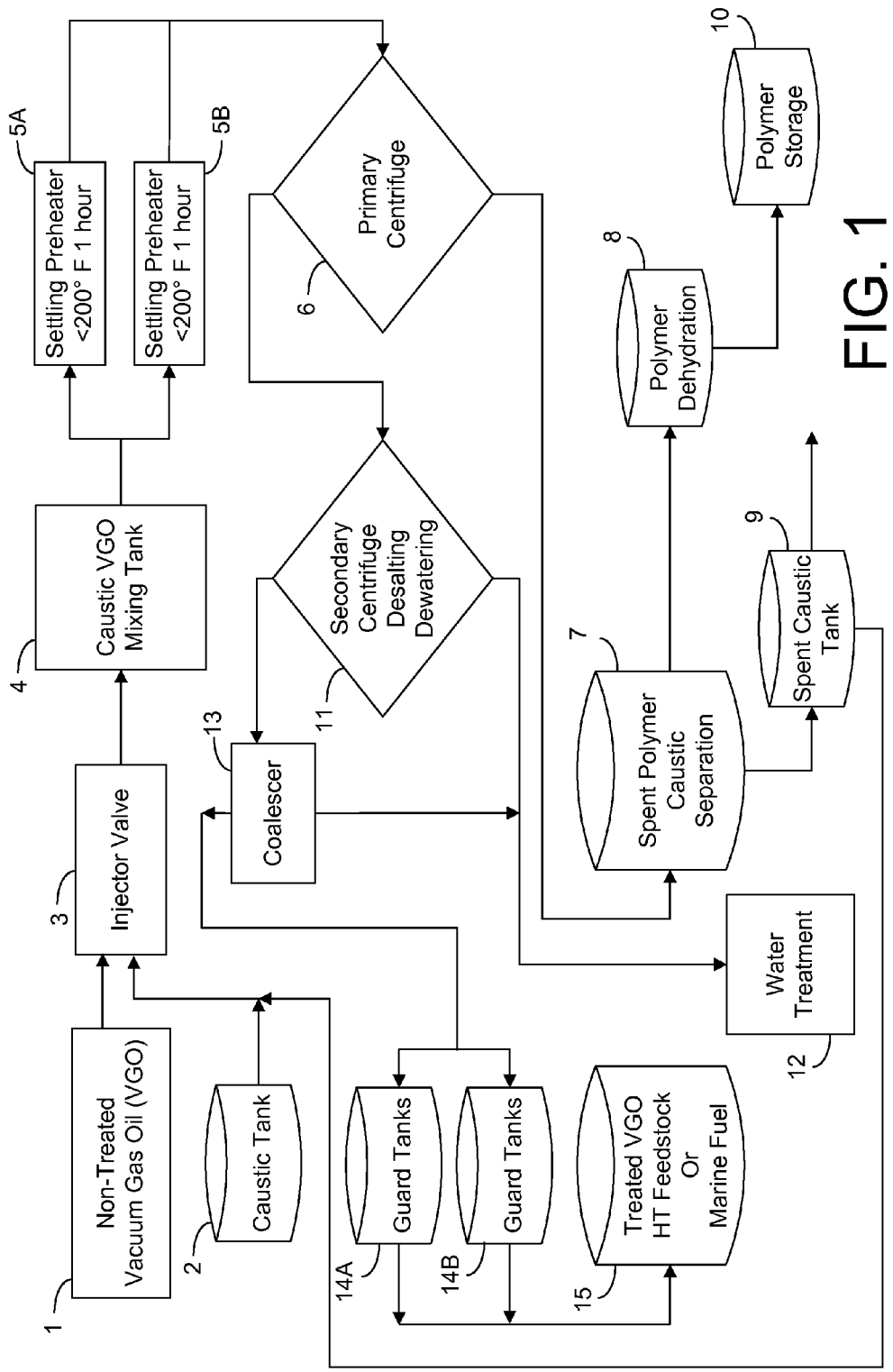
FIG. 1 shows a pictorial view of a process in flowchart form embodying features of an embodiment of the present invention.

As shown in FIG. 1, a pictorial view of a process in flowchart form embodying features of the present invention comprises the steps of emulsifying non-treated vacuum gas oil 1 and sodium hydroxide (caustic) at strength of 25% or less caustic at 1.4% volume to the amount of VGO 2 through an injector valve 3. Both streams are further emulsified in a mixing tank 4. Effluent from the mixing tank then enters one of a plurality of settling preheaters (use of preheaters are alternated) for approximately one hour at a temperature of 200° F. or less 5A, 5B. Following treatment, the contents of the plurality of settling preheaters 5A, 5B consists of 1) a coalescence of contaminations (waste products) and caustic on bottom and 2) a VGO colloidal suspension on top (i.e. VGO with colloids of water and salt from the sodium hydroxide). The waste products and VGO are then drawn into a primary two phase centrifuge 6. By centrifugal force, the spent polymers, caustic, water, asphaltenes and organic metals that are present in the spent polymer are separated from the main stream and conveyed to a spent polymer caustic separation tank 7. Separation of spent polymer and caustic in the spent polymer caustic separation tank 7 is achieved by allowing the lower density spent polymer to overflow from the top of the spent polymer caustic separation tank 7 into a polymer dehydration tank 8 and by removing the higher density caustic 9 from the bottom of the spent polymer caustic separation tank 7. A portion of the separated caustic is recycled back to the beginning of the process 9. In continuous operations the spent polymer is dehydrated then stored in a polymer storage tank 10. A secondary two-phase centrifuge 11 receives the partially treated VGO from the primary centrifuge 6 and removes traces of water and salts from the sodium hydroxide. The separated water and salts are discharged into a waste water storage tank 12 for further water treatment with an optional coalescer 13 (designed to reduce sodium further if needed) for dewater and desalting purposes. The treated VGO is discharged from the secondary centrifuge 11 and optional coalescer 13 for further desalting prior to entering into storage guard tanks 14A, 14B. Samples of the VGO are collected from the guard tanks and are analyzed for water and sodium and if these parameters are within specifications the VGO will be transferred from the guard tanks to a finished product tank 15. The feed rate into the primary centrifuge is determined by the capacity of the settling preheaters 5A, 5B (i.e. 5,000 gallons of chemically heat treated product for one hour would approximately equal a feed rate of 83 gallon per minute).

Figure 2:
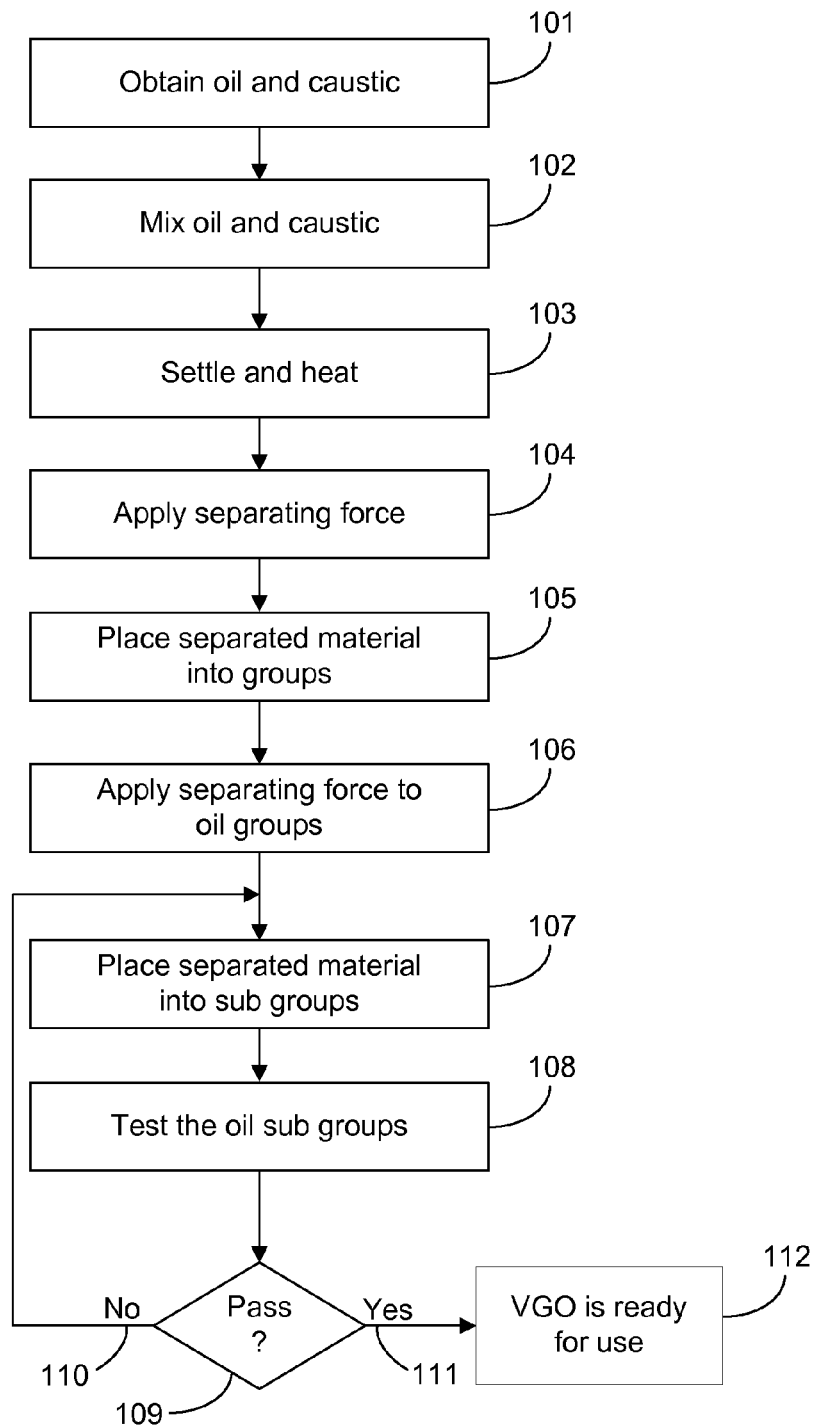
FIG. 2 shows a pictorial view of a process in flowchart form embodying features of an embodiment of the present invention.

As shown in FIG. 2, a pictorial view of a process in flowchart form embodying features of the present invention comprises the steps of obtaining VGO and caustic substance 101. The caustic substance can be sodium hydroxide to name on example. Then mixing the VGO and caustic 102. Allowing the mixture formed by mixing the VGO and caustic 102 to settle and be heated 103. Next step is the applying of a force, such as by a centrifuge for instance, to the mixture to separate the substances 104. Placing the separated substances into groups 105, some of the groups contain VGO and others do not, such as those groups that contain polymers or caustic substance. Applying a force to the VGO group or groups, i.e. the oil-containing groups or more generally oil groups 106. Placing the separated substances into subgroups 107. Next the VGO containing subgroups, referred to as the oil subgroups, are tested to see if they have been sufficiently separated from unwanted materials 108. If the test passes 109 then the recycled oil, e.g. treated VGO, is ready for its end use 112. If the test does not pass 110, then a force is again applied 106.

Although the present invention has been described in considerable detail with the reference to certain preferred versions thereof, other versions are possible. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. § 112, ¶6.

What I claim is:

1. An oil refining system for refining used oil, the system comprising:
   a source of untreated vacuum gas oil (VGO) produced from used lubricating oil, the VGO comprising additive polymer contaminants,
   an injector valve being capable of mixing the untreated with caustic material;
   a caustic/VGO mixing tank being capable of receiving the VGO and caustic material mixture;
   a settling preheater being capable of receiving the VGO and caustic material mixture and heating the mixture for between 40 minutes and 80 minutes while the mixture settles;
   a primary centrifuge being capable of applying a separating force to the settled mixture and separating the settled mixture into an oil-containing group and another group;
   a secondary centrifuge being capable of applying a separating force to the oil-containing group into an oil-containing subgroup and an unwanted material;
   wherein the oil-containing subgroup being determined to be sufficiently separated, the oil-containing subgroup being released from the system for use.

2. The oil refining system of claim 1, wherein the injector valve is configured to mix the untreated VGO and caustic material to achieve a 0.014 ratio of caustic material to VGO and the caustic material being sufficiently diluted to about 25% strength.

3. The oil refining system of claim 1, wherein the oil-containing subgroup is released from the system for use in marine fuel or similar fuel oil blend applications.

4. A used-oil refining system for removing chemical additive polymer contaminants from non-treated vacuum gas oil (VGO), the system comprising:
   a source of non-treated vacuum gas oil (VGO) produced from used lubricating oil, the VGO comprising additive polymer contaminants;
   a caustic source;
   a mixing valve conduit-connected to both the VGO source and the caustic source;
   a caustic/VGO mixing tank configured to receive emulsified caustic/VGO mixture via conduit-connection from the mixing valve;
   one or more settling preheaters configured to receive the mixture via conduit-connection from the mixing tank and to coalesce polymer contaminants and caustic present in the mixture;
   a primary centrifuge configured to receive the coalesced mixture from the one or more settling preheaters via conduit-connection and separate the mixture into a main stream of polished VGO and an ancillary stream containing polymer contaminants and caustic via centrifugal force;
   a polymer/caustic separation tank configured to receive the ancillary stream from the primary centrifuge via conduit-connection between the primary centrifuge and the polymer/caustic separation tank; and
   a secondary centrifuge configured to receive the main stream from the primary centrifuge via the conduit-connection between the primary centrifuge and the secondary centrifuge, and to separate water and salts from the main stream via centrifugal force.

5. The used-oil refining system of claim 4, wherein the one or more settling preheaters are configured to heat the mixture for between forty and eighty minutes while the mixture settles to facilitate coalescence of the polymer contaminants and the caustic.

6. The used-oil refining system of claim 5, wherein the one or more preheaters are configured to heat the mixture to 200° F. or less.

7. The used-oil refining system of claim 4, wherein the caustic is sodium hydroxide at a concentration of approximately 25 percent.

8. The used-oil refining system of claim 4, wherein the mixing valve is configured to deliver a VGO/caustic mixture of approximately 1.4 percent caustic by volume.

9. The used-oil refining system of claim 4, wherein spent caustic is recycled to the caustic source after removal from the bottom of the polymer/caustic separation tank via conduit-connection.

10. A method of operating a used-oil refining system configured to remove chemical additive polymers from the used-oil, the method comprising:
- providing non-treated vacuum gas oil (VGO) produced from used lubricating oil, the VGO comprising additive polymers;
- providing caustic in a caustic source, the caustic being diluted to a concentration of approximately 25 percent;
- mixing the VGO and the caustic through a mixing valve;
- receiving the caustic/VGO mixture in a caustic/VGO mixing tank via conduit-connection between the mixing valve and the caustic/VGO mixing tank;
- coalescing polymer contaminants and caustic from the mixture received from the caustic/VGO mixing tank in one or more settling preheaters;
- separating the coalesced mixture received from the one or more settling preheaters into a main stream of polished VGO and an ancillary stream containing polymer contaminants and caustic via centrifugal force in a primary centrifuge;
- receiving the ancillary stream in a polymer/caustic separation tank via conduit-connection between the primary centrifuge and the polymer/caustic separation tank;
- receiving the main stream in a secondary centrifuge via conduit-connection between the primary centrifuge and the secondary centrifuge; and
- separating the main stream into water and salts in the secondary centrifuge via centrifugal force.

11. The method of claim 10, further comprising heating the mixture in the one or more settling preheaters for between forty and eighty minutes while the mixture settles to facilitate coalescence of the polymer contaminants and the caustic.

12. The method of claim 10, wherein the one or more preheaters are configured to heat the mixture to 200° F. or less.

13. The method of claim 10, wherein the caustic is sodium hydroxide at a maximum concentration of 25 percent.

14. The method of claim 10, wherein the mixing valve is configured to deliver a VGO/caustic mixture of approximately 1.4 percent caustic by volume.

15. The method of claim 10, further comprising recycling spent caustic to the caustic source after removal from the polymer/caustic separation tank via conduit-connection from the bottom of the polymer/caustic separation tank.

16. A used-oil refining system for removing chemical additive polymer contaminants from non-treated vacuum gas oil (VGO), the system comprising:
- a source of non-treated vacuum gas oil (VGO) produced from used lubricating oil, the VGO comprising additive polymer contaminants;
- a sodium hydroxide solution source;
- a mixing valve conduit-connected to both the VGO source and the sodium hydroxide solution source and configured to create a sodium hydroxide/VGO mixture of approximately 1.4 percent caustic by volume;
- a caustic/VGO mixing tank configured to receive the mixture via conduit-connection from the mixing valve;
- one or more settling preheaters configured to receive the mixture via conduit-connection from the mixing tank and bond and coalesce the polymer contaminants and the sodium hydroxide present in the mixture via a controlled temperature for a controlled time period;
- a primary centrifuge configured to receive the coalesced mixture from the one or more settling preheaters via conduit-connection between the one or more settling preheaters and the primary centrifuge, and to separate the mixture into a main stream of polished VGO and an ancillary stream containing polymer contaminants and caustic via centrifugal force;
- a polymer/caustic separation tank configured to receive the ancillary stream from the primary centrifuge via conduit-connection between the primary centrifuge and the polymer/caustic separation tank; and
- a secondary centrifuge configured to receive the main stream from the primary centrifuge via the conduit-connection between the primary centrifuge and the secondary centrifuge, and to separate water and salts from the main stream via centrifugal force.

17. The used-oil refining system of claim 16 further comprising a coalescer configured to receive an oil-containing subgroup including less water and salts via conduit-connection between the secondary centrifuge and the coalescer, and a waste water storage tank configured to receive another subgroup including more water and salts than the oil-containing subgroup.

18. The used-oil refining system of claim 17, further comprising one or more storage guard tanks configured to receive treated VGO via conduit-connection between the coalescer and the one or more storage guard tanks.

* * * * *